(12) United States Patent
Suyama

(10) Patent No.: US 6,448,546 B1
(45) Date of Patent: Sep. 10, 2002

(54) INTEGRATING PHOTODETECTION SYSTEM

(75) Inventor: Motohiro Suyama, Hamamatsu (JP)

(73) Assignees: Hamamatsu Photonics K.K., Hamamatsu (JP); Rados Technology Oy, Turku (FI)

( * ) Notice: Subject to any disclaimer, the term of this patent is extended or adjusted under 35 U.S.C. 154(b) by 0 days.

(21) Appl. No.: 09/524,393

(22) Filed: Mar. 13, 2000

(51) Int. Cl.⁷ .............................................. H01J 40/14
(52) U.S. Cl. .................................. 250/214 R; 250/239
(58) Field of Search ..................... 250/214 R, 214 LS, 250/214 VT, 216, 207, 239; 313/530, 532, 537, 365, 379

(56) References Cited

U.S. PATENT DOCUMENTS

| | | |
|---|---|---|
| 3,563,657 A | 2/1971 | Kniseley et al. |
| 5,113,077 A | 5/1992 | Shimizu et al. ........ 250/370.11 |
| 5,883,466 A * | 3/1999 | Suyama et al. ............. 250/207 |

FOREIGN PATENT DOCUMENTS

| | | |
|---|---|---|
| FR | 2 284 868 | 4/1976 |
| JP | 61-211941 | 9/1986 |
| JP | 5-215602 | 8/1993 |
| JP | 6-18325 | 1/1994 |
| JP | 6-341899 | 12/1994 |
| JP | WO 97/02609 | 1/1997 |
| JP | 10142341 | * 5/1998 |

* cited by examiner

Primary Examiner—Kevin Pyo
(74) Attorney, Agent, or Firm—Morgan, Lewis & Bockius LLP

(57) ABSTRACT

The system comprises a main body unit 4 which has a first terminal 7 and a head unit 6 which has a second terminal 9 attachable to and detachable from the first terminal 7 and which is attachable to and detachable from the main body unit 4. The head unit 6 has a photosensor 18 connected to the second terminal 9 and adapted to generate photocurrent according to incident optical power, and a capacitor 20 connected to the photosensor 18. The main body unit 4 has a charging circuit 31 connected to the first terminal 7 and being capable of charging the capacitor 20 while the first terminal 7 is coupled to the second terminal 9, and a reading circuit 31 capable of reading a voltage of the capacitor 20 while the first terminal 7 is coupled to the second terminal 9. The capacitor 20 is discharged as the photocurrent is generated.

6 Claims, 7 Drawing Sheets

INTEGRATING PHOTODETECTION SYSTEM

BACKGROUND OF THE INVENTION

1 Field of the Invention

The present invention relates to an integration type photodetection system for integrating optical power of light incident to a photosensor to output the integration result.

2 Related Background Art

The conventionally known, integrating luminous energy detecting devices include the integrating photodetectors disclosed in the official gazettes of Japanese Patent Application Laid-Open No. 5-215602, Japanese Patent Application Laid-Open No. 6-18325, Japanese Patent Application Laid-Open No. 6-341899, and WO97/02609. The Integrating photodetectors disclosed in these official gazettes can measure the quantity of light incident to the photosensor by accumulating charge from the photosensor for a predetermined time.

In the integrating photodetectors disclosed in Japanese Patent Applications Laid-Open No. 5-215602, No. 6-18325, and No. 6-341899, however, an integrating circuit for integrating the output of the photosensor is constructed of an active circuit comprised of a power supply, a transistor, etc., and the power must be on during the integration of optical power. This posed the problem that reduction of power consumption was not possible.

On the other hand, WO97/02609 discloses an electron tube which consists of a photocathode and a MOS transistor having a floating gate opposed thereto and which acts as an integrating photodetector. In this electron tube, the gate electrode of the MOS transistor placed in the electron tube is exposed in vacuum so as to face the photocathode. The gate of the MOS transistor is preliminarily charged with predetermined positive charge by tunneling from the substrate, so that a voltage appears depending upon the capacitance between the gate and the substrate (the source and the drain). Since this voltage acts as the gate voltage of the MOS transistor, it can be read out in the form of drain current by placing a predetermined voltage between the source and the drain. When electrons are emitted from the photocathode in accordance with the incident power of light, the electrons fly to the gate maintained at a higher potential than the photocathode, so as to discharge the positive charge stored in the gate. This changes the gate voltage and the gate voltage thus changed can be detected in the form of drain current. At this time, change of the drain current is dependent on the number of electrons emitted from the photocathode, i.e., dependent upon the integral of incident optical power. This integrating photodetector disclosed in WO97/02609 can integrate the incident optical power to some extent even with interruption of the power supplied to the source and the drain, because the gate electrode of the MOS transistor is placed in an insulated state from the substrate.

SUMMARY OF THE INVENTION

The integrating photodetector disclosed in WO97/02609, however, had the following problems. Namely, the photodetector can be applicable to only the integration of low incident optical power, because the small capacitance between the gate and the substrate of the MOS transistor is used as a capacitance for the integration of incident optical power. This raised the problems that all the charge was discharged instantaneously with incidence of light of high power and that the detector permitted only the integration of small quantity of light even if the light was received for a long period.

The present invention has been accomplished under such circumstances and an object of the present invention is to provide an integrating photodetection system in which an integral capacity can be set readily according to incident optical power.

In order to solve the above problems, the present invention is directed to an integrating photodetection system for integrating light incident to a photosensor to detect a quantity of the incident light, the photodetection system comprising a main body unit which has a first terminal, and a head unit which has a second terminal attachable to or detachable from the first terminal and which is attachable to or detachable from the main body unit, the head unit comprising the photosensor which is connected to the second terminal and which generates photocurrent according to the quantity of the incident light, and a capacitor which is connected to the photosensor, the main body unit comprising a charging circuit which is connected to the first terminal and which can charge the capacitor while the first terminal is coupled to the second terminal, and a reading circuit which can read a voltage of the capacitor out while the first terminal is coupled to the second terminal, wherein the capacitor is discharged as the photocurrent is generated.

In the integrating photodetection system according to the present invention, the capacitor of the head unit is charged by the charging circuit of the main body unit while the first terminal of the main body unit is coupled to the second terminal of the head unit. After completion of the charging, the quantity of the incident light is measured by the head unit. When light is incident to the photosensor of the head unit, the photosensor generates the photocurrent according to incident optical power. Then the charge accumulated in the capacitor is discharged as the photocurrent is generated. Namely, the incident optical power is integrated as the capacitor is discharged. Once the capacitor is discharged up, it thus becomes impossible to integrate the incident optical power further. However, if a capacitor with a large capacitance is used instead the head unit becomes fit for incidence of light of high power and for reception of light for a long period. In other words, the present invention permits the integrate capacitance to be set according to the incident optical power, by changing the capacitance of the capacitor. After the end of incidence of light to the photosensor, the voltage of the capacitor after the discharge is read out by the reading circuit of the main body unit while the first terminal of the main body unit is coupled to the second terminal of the head unit. Then the quantity of the light incident to the photosensor is computed based on the voltage thus read out.

Preferably, in the present invention, the photosensor is an electron tube comprising a photocathode for emitting photoelectrons according to incidence of the light, and a target of the photoelectrons.

Here, when light is incident to the photocathode of the electron tube as the photosensor, photoelectrons are emitted from the photocathode. Specifically, for example, the target of photoelectrons is connected to the positively charged plate of the capacitor, the photocathode is connected to the negatively charged plate of the capacitor, and the target is kept at a higher potential than the photocathode; whereby the photoelectrons emitted from the photocathode are attracted to the target to induce flow of photocurrent. Then the charge stored in the capacitor is discharged as the photocurrent is generated.

Preferably, in the present invention, the photosensor is a semiconductor device comprised of a pn junction.

Here, when light is incident to the semiconductor device, for example, like a photodiode as the photosensor, photocurrent is generated in the semiconductor device. Then the n-type semiconductor of the semiconductor device is connected to the positively charged plate of the capacitor, the p-type semiconductor of the semiconductor device is connected to the negatively charged plate of the capacitor, and the n-type semiconductor of the semiconductor device is kept at a higher potential than the p-type semiconductor of the semiconductor device; whereby the photoelectrons generated in the semiconductor device migrate toward the n-type semiconductor of the semiconductor device. On this occasion the charge stored in the capacitor is discharged.

Preferably, in the present invention, the head unit comprises a plurality of photosensors and capacitors connected to the photosensors and wherein each of the plurality of photosensors and the plurality of capacitors is connected to the second terminal.

Here, since the head unit comprises a plurality of photosensors and capacitors corresponding thereto, it can measure not only the quantity of the light incident to the head unit, but also illuminance distribution of the light incident to the head unit by contrast of charge amounts stored in the respective capacitors.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DESCRIPTION OF THE PREFERRED EMBODIMENTS

Preferred embodiments of the integrating photodetection apparatus according to the present invention will be described in detail with reference to the accompanying drawings. Like elements will be denoted by identical reference symbols and redundant description will be omitted.

(First Embodiment)

Figure 1:
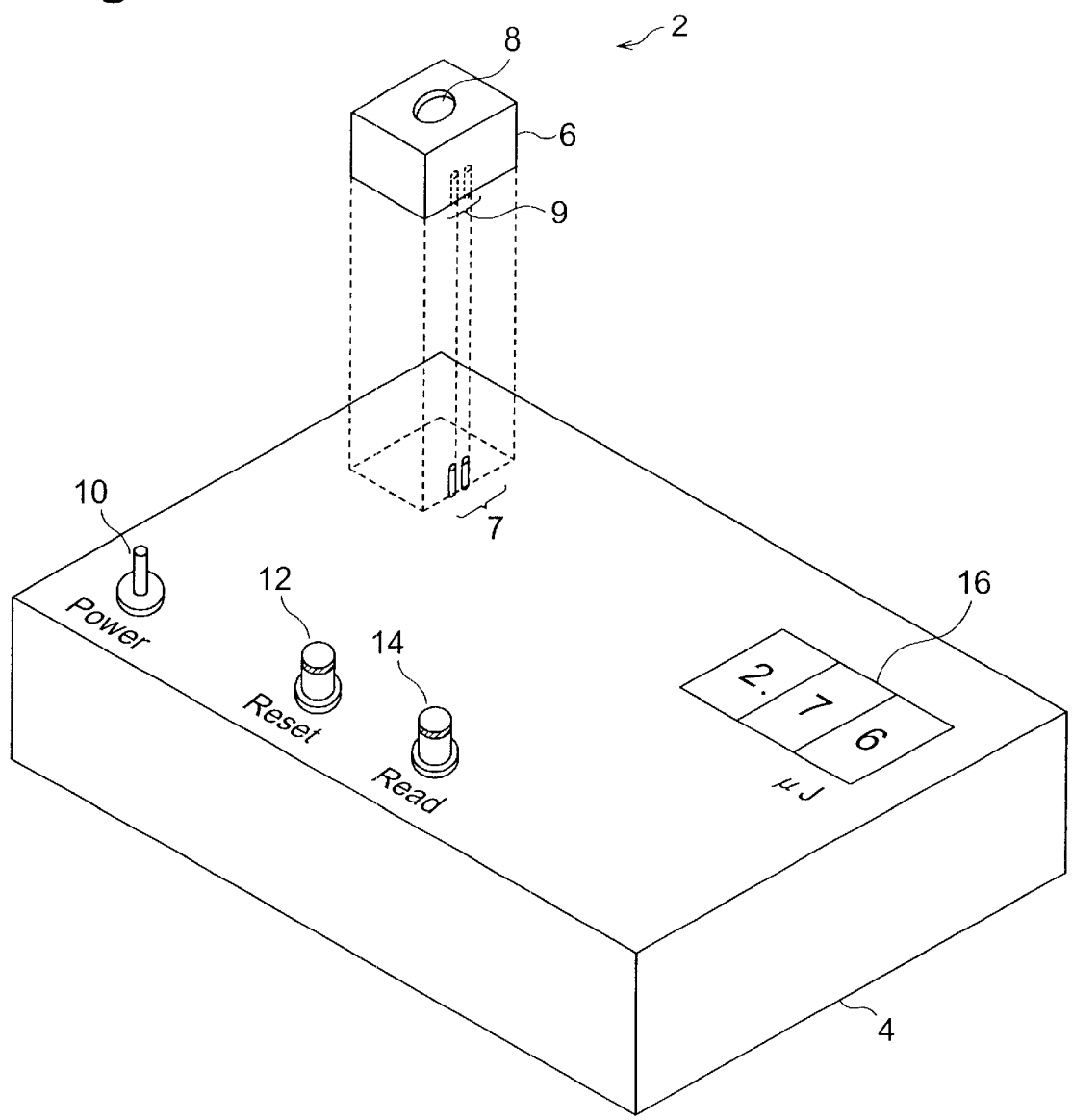
FIG. 1 is an overall perspective view to show the first embodiment of the integrating photodetection system according to this invention.

FIG. 1 is an overall perspective view to show the first embodiment of the integrating photodetection system 2 according to the present invention. The integrating photodetection system 2 is arranged to integrate optical power of incident light to output and display the result and is composed of a main body unit 4 and a head unit 6 which is attachable to and detachable from the main body unit 4. The head unit 6 is substantially of a rectangular parallelepiped shape and an entrance port 8 for incidence of measured light is formed in an upper surface thereof. On the other hand, the main body unit 4 is provided with a power switch 10, a reset button 12 for charging a capacitor incorporated in the head unit 6, which will be detailed hereinafter, a reading button 14 for reading the voltage of the capacitor, and a display 16 for displaying an integral value of incident optical power to the entrance port 8 of the head unit 6. The main body unit 4 and the head unit 6 have A-terminals (first terminals) 7 and B-terminals (second terminals) 9, respectively, for electrical connection between their internal circuits.

Figure 2:
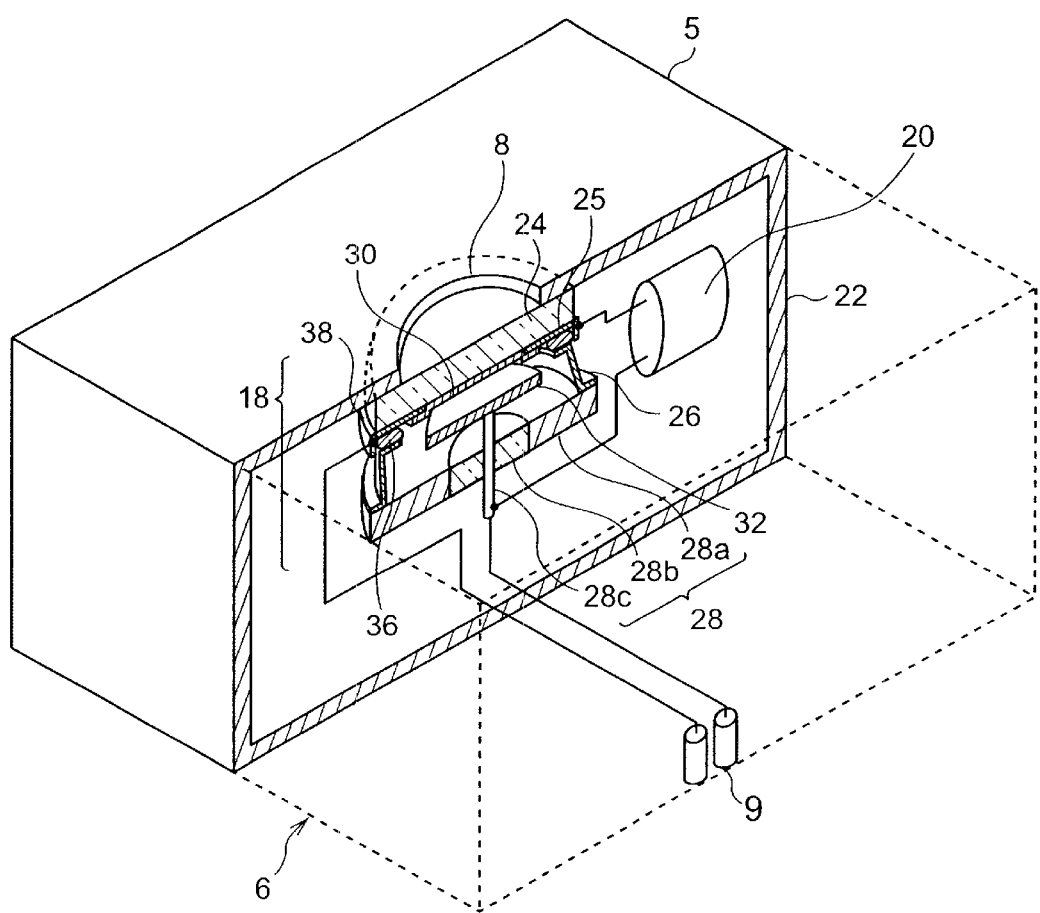
FIG. 2 is a partially sectional, perspective view of the head unit in the integrating photodetection system according to the first embodiment.

FIG. 2 is a partly sectional, perspective view of the head unit 6. As illustrated in this figure, the head unit 6 comprises a phototube (photosensor) 18 connected to the above B-terminals 9, a capacitor 20 connected to the phototube 18, and a case 22 for housing the phototube 18 and capacitor 20. Namely, the head unit 6 is constructed of a passive circuit with high heat resistance consisting of the phototube 18 and capacitor 20. Vacuum tightness inside the phototube 18 is maintained by an input face plate 24 placed below the entrance port 8, a cylindrical side tube 26 0.5 mm thick, and a stem 28. Inside the phototube 18, a photocathode 30, which emits photoelectrons with incidence of light, and an anode electrode 32, which is a target of the photoelectrons emitted from the photocathode 30, are opposed in close proximity to each other. The photocathode 30 and anode electrode 32 used herein are those having approximately equal areas.

The input face plate 24 is made of optically transparent glass in a disk shape and the side tube 26 is made of the Kobar metal in a substantially cylindrical shape. The stem 28 is comprised of an external part 28a of Kobar, an internal part 28b of glass, and a through pin 28c insulated from the external part 28a by the internal part 28b of the insulator. The photocathode 30 is placed under the input face plate 24 in the drawing, i.e., in the vacuum area.

The photocathode 30 is formed according to the wavelength of the light to be measured, by deposition of metal such as Na, K, Cs, Sb, or the like by repetitive evaporation or by use of GaAs crystal, diamond crystal, CsI evaporated film, and so on. The photocathode 30 is electrically connected to the side tube 26 via chromium electrode 25 deposited by evaporation at the periphery of the lower surface of the input face plate 24, indium 36 for retaining the vacuum, and indium ring 38 for securing this indium 36. The chromium electrode 25, indium 36, and indium ring 38 are formed in a ring shape. On the other hand, the anode electrode 32 opposed in close proximity to the photocathode 30 is connected via the through pin 28c to the B-terminal 9 outside the phototube 18.

The two plates of the capacitor 20 are connected to the photocathode (cathode electrode) 30 and to the anode electrode 32 of the phototube 18. The two plates of the capacitor 20 are also electrically connected to the B-terminals 9. While the B-terminals 9 are coupled to the A-terminals 7

(see FIG. 1) of the main body unit 4, the voltage of the capacitor 20 can be read out and charged (or reset). The magnitude of the capacitance of capacitor 20 is preliminarily selected as an appropriate value fit for incident optical energy. The apparatus may also be constructed so as to be able to select a suitable one out of several capacitors through a mechanical switch.

Figure 3:
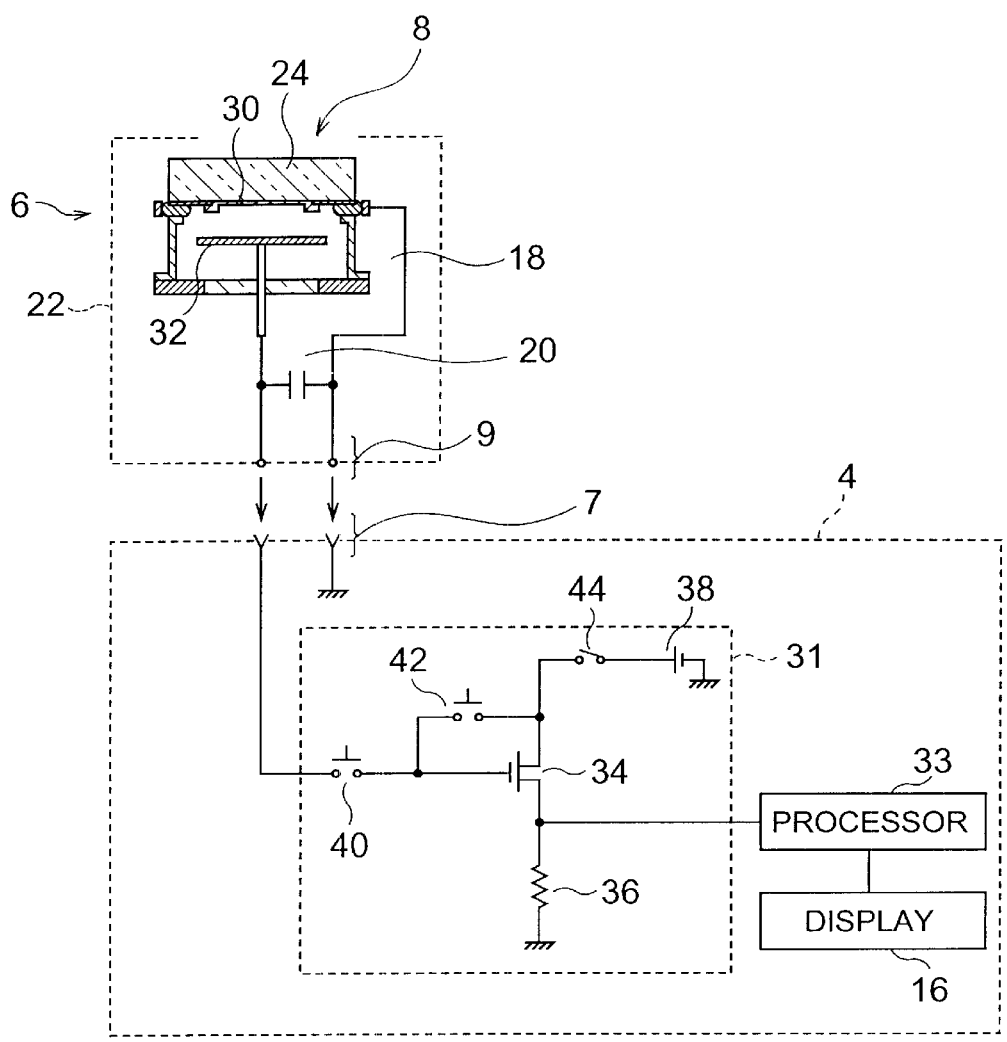
FIG. 3 is a diagram to show an equivalent circuit of the head unit and the main body unit in the integrating photodetection system according to the first embodiment.

FIG. 3 shows an equivalent circuit of the main body unit 4 and the head unit 6. The main body unit 4 and the head unit 6 are electrically connected to each other by putting the B-terminals 9 into the A-terminals 7. The main body unit 4 is composed of the above A-terminals 7 for coupling with the B-terminals 9 of the head unit 6, a signal reading section 31 for reading out an electric signal generated with incidence of light to the photocathode 30, an arithmetic unit 33 for converting output of the signal reading section 31 into incident optical energy, and the aforementioned display unit 16 for displaying the arithmetic result obtained by the arithmetic unit 33. The signal reading section 31 also has the function of charging the capacitor 20, in addition to the function of reading out the electric signal generated with incidence of light to the photocathode 30.

The signal reading section 31 comprises a MOSFET 34, a resistor 36 connected to the source electrode of the MOSFET 34, a power supply (12 V) 38 connected to the drain electrode of the MOSFET 34, a first switch 40 placed between the A-terminal 7 and the MOSFET 34, a second switch 42 one contact of which is connected to between the gate electrode of MOSFET 34 and the first switch 40 and the other contact of which is connected to between the drain electrode of MOSFET 34 and the power supply 38, and a third switch 44 placed between the drain electrode of MOSFET 34 and the power supply 38. Although omitted from the illustration, each of the switches 40 to 44 is arranged so as to become active in linkage with manipulation of the reset button 12 and the reading button 14 (see FIG. 1). The signal reading section 31 comprising the MOSFET 34 is a source follower circuit in which the signal from the head unit 6 is transmitted to the gate electrode. The gate electrode of the MOSFET 34 to which the signal from the head unit 6 is transmitted is insulated by the high resistance of $10^{15}$ Ω or more.

The operation of the integrating photodetection system 2 according to the present embodiment will be described referring to FIG. 3. When the B-terminals 9 are put into the A-terminals 9, the head unit-6 is first attached to the main body unit 4. At this time, the third switch 44 is on. For resetting (or charging) the charge stored in the capacitor 20 of the head unit 6, an operator pushes the reset button 12 of the main body unit 4. In linkage with the manipulation of the reset button 12, the first switch 40 is then turned on and the second switch 42 is also turned on thereafter. This causes electric current to flow from the power supply 38 to the capacitor 20, thereby charging the capacitor 20. At this time the voltage of 12 V is applied to the capacitor 20. While the capacitor 20 is charged, the right plate of the capacitor 20 is grounded and positive charge is accumulated in the left plate in FIG. 3.

At the same time as the application of the voltage of 12 V to the capacitor 20, the voltage of 12 V is also placed between the photocathode 30 and the anode electrode 32 of the phototube 18 and 12 V (initial gate voltage Vg0) is also applied to the gate electrode of the MOSFET 34. When the voltage is applied to the gate electrode of the MOSFET 34, drain current flows to the resistor 36, and the output voltage can be measured. The output voltage is converted into incident optical energy by the arithmetic unit 33, whereupon the display unit 16 displays 0 μJ.

In the photodetector described in WO97/02609, the tunnel current flowing between the substrate and the gate has to be used in order to reset the charge, thus posing the problem that the process of the internal FET is complicated. In contrast with it, the integrating photodetection system 2 of the present embodiment can achieve simplification of the charging process, because the charge used for gaining the integral of incident optical power can be supplied by simply letting the current flow from the power supply 38 to the capacitor 20.

After confirming that the display unit 16 displays 0 μJ, the operator pulls the head unit 6 off the main body unit 4 to initiate measurement of incident light. Since the head unit 6 is constructed of the passive circuit with high heat resistance comprised of the phototube 18 and capacitor 20 in this structure, there will be little degradation of the measurement function of incident optical power of the head unit 6 even if the head unit 6 is used under high-temperature circumstances. Once light is incident to the entrance port 8 of the head unit 6 to reach the photocathode 30, the photocathode 30 emits electrons and the electrons reach the anode electrode 32 to generate photocurrent. The charge stored in the capacitor 20 is discharged as the photocurrent is generated. The discharging of the charge results in lowering the terminal-to-terminal voltage of the capacitor 20. With progress in the discharging of the capacitor 20, incident optical power will be integrated hereinafter. On the other hand, without incidence of light to the phototube 18, the charge stored in the capacitor 20 is retained.

Since the photodetector described in WO97/02609 used the gate electrode of FET having only the small area as the target of electrons, it had the problem that electron collection efficiency was poor and sensitivity was instable; whereas the integrating photodetection system 2 of the present embodiment can be improved in the electron collection efficiency, because the area of the anode electrode 32 as the target of electrons is approximately equal to that of the photocathode 30.

As the discharging of the charge stored in the capacitor 20 is further developed with increase of incident optical power, the voltage decreases between the photocathode 30 and the anode electrode 32. The decrease of the voltage between the photocathode 30 and the anode electrode 32 weakens the intensity of the electric field for drawing photoelectrons out of the photocathode 30 and could result in failing to measure the photocurrent according to the incident optical power. However, since in the present embodiment the photocathode 30 and anode electrode 32 are placed in close proximity to each other as described above, the electric field enough for the photoelectrons to be attracted to the anode electrode 32 will be applied to the photocathode 30, even if the voltage becomes low between them. The distance between the photocathode 30 and the anode electrode 32 is preferably about 1 mm.

After completion of reception of incident light by the head unit 6, the head unit 6 is connected again to the main body unit 4 and the operator initiates an operation to measure the terminal-to-terminal voltage of the capacitor 20 after the variation corresponding to the incident optical energy. For measuring the terminal voltage of the capacitor 20, the operator couples the head unit 6 to the main body unit 4 and thereafter pushes the reading button 14. In linkage with the manipulation of the reading button 14, the first switch 40 and third switch 44 are then turned on, whereupon the terminal voltage of the capacitor 20 is applied to the gate electrode of the MOSFET 34. Then the integral of incident optical power during the measurement is computed based on a difference ΔVg between the gate voltage Vg at this time and the initial gate voltage Vg0, (Vg−Vg0).

When the capacitance of the capacitor 20 mounted on the head unit 4 is C and the sensitivity of the phototube 18 is S (A/W), the discharged charge quantity Q (C) during the measurement and the integral E (J) of incident optical power are given by the following equations.

$$Q = \Delta Vg \times C$$

$$E = Q/S$$

This arithmetic operation is carried out by the arithmetic unit 33. The voltage that can be measured actually is not the gate voltage but the output voltage obtained from the flow of the drain current to the resistor 36. However, since the gate voltage can be determined uniquely based on the output voltage once the performance of the FET and the resistance are fixed, the integral of incident optical power can be computed from the output voltage. The incident optical energy computed by the arithmetic unit 33 is displayed in the display unit 16.

The integrating photodetection system 2 of the present embodiment permits the integral of incident optical power before the charge stored in the capacitor 20 is discharged up. For this reason, the capacitor 20 with a large capacitance can be used in cases wherein the measurement of incident optical power is carried out over a long period and wherein light of high power can be incident instantaneously. Although illustration is omitted, it is also possible to read and store the arithmetic result in a computer. It is also possible to construct the main body unit 6 as part of a computer and utilize the arithmetic function of the computer.

In the integrating photodetection system 2 of the present embodiment, it is important to minimize leak current from all the circuit components and wires connected to the photocathode (cathode) 30 and the anode electrode 32 of the phototube 18. This is because the leak current could discharge the charge stored in the capacitor 20 and in turn cause an error of measurement. Since the gate electrode of MOSFET 34 is insulated by the high resistance of $10^{15}$ Ω or more as described above, the leak current therefrom is as small as negligible and there occurs no error in signal reading. The integrating photodetection system 2 of the present embodiment uses the phototube 18 as a photosensor and the phototube has the advantage of little dark current and little leak current. Normally, the dark current and leak current of phototube both are approximately 0.1 fA. When the integration is carried on for about eight hours by use of the capacitor 20 having the capacitance of 1 μF, a variation in Vg due to the total of the two currents is approximately 6 μV, which is a properly permissible error.

The capacitor 20 used is one cleaned well, thereby suppressing occurrence of leak current. Further, it is also desirable to use relays with little leak current as the switches 40 to 44 of the signal reading section 31 similarly. Increase of leak current can also be prevented effectively by carrying out ultrasonic cleaning of the various circuit components with isopropyl alcohol, thereafter drying them at the ambient temperature of about 80° C., and then covering them with a protection coating. Since the leak current is constant, it is desirable in the case of use of a photosensor with great leak current to preliminarily record the leak current and subtract it as an offset from a signal to output the result.

Application examples of the integrating photodetection system 2 of the present embodiment are use in measurement of optical energy under circumstances where active circuits do not operate and use in measurement of optical energy with emphasis on portability. Examples of the former involve use under radiation circumstances and application to an in-line monitor of excimer lamp. In the application to the in-line monitor of excimer lamp, the photodetector needs to be placed in close proximity to the excimer lamp and on this occasion the temperature of the photodetector becomes about 100° C. An active integrating circuit comprised of a battery and a transistor circuit cannot be used under such high-temperature circumstances. In the case of the integrating photodetection system 2 of the present embodiment, since the head unit 6, which is constructed of the passive circuit with high heat resistance comprised of the phototube 18 and capacitor 20 as described above, can be used in a separate state from the main body unit 4, it can be used as a photodetector for the in-line monitor of excimer lamp.

An example of the latter use in measurement of optical energy with emphasis on portability is a portable radiation monitor. The radiation monitor needs to be carried by a user during work and to measure an exposure dose by integration of radiation. Therefore, the detector is required to have the integral function of incident radiation dose and characteristics including a compact size, a light weight, low power consumption, and so on. With the integrating photodetection system 2 of the present embodiment, the radiation monitor meeting such requirements can be realized readily by placing a scintillator for converting radiation to light, immediately before the photosensor, specifically, on the upper surface of the entrance face plate 24. In use of the radiation monitor, the user first connects the head unit 6 to the main body unit 4 to reset (or charge) it, and thereafter the user disconnects the head unit 6 from the main body unit 4 and carries it. After a lapse of a predetermined time, the user then connects the head unit 6 to the main body unit 4 again to read the integral of incident radiation energy (radiation dose). In this case, the main body unit 4 is constructed as part of a computer and a day exposure dose is recorded and managed for every individual. As described, the radiation monitor as an application of the integrating photodetection system 2 according to the present embodiment does not necessitate the power supply during the period of being carried; therefore, it can reduce the scale and the power consumption. When compared with film badges usually used, the radiation monitor has the advantage of capability of outputting an exposure instantaneously after completion of work, because it does not involve the process of development.

The methods of use in the disconnected state of the head unit 6 from the main body unit 4 were described above as use methods of the integrating photodetection system 2 according to the first embodiment, but it is noted that the integrating photodetection system 2 also permits use in a connected state of the head unit 6 to the main body unit 4 and has the advantage of lower power consumption in this case than in the conventional technology. In this case, the head unit 6 is in the connected state to the main body unit 4, the first switch 40, second switch 42, and third switch 44 are turned on to charge (or reset) the capacitor 20, and then the second switch 42 is turned off. At this time, the supply of power to the MOSFET 34 is interrupted by turning the third switch 44 off, so that no power is consumed. After the third switch 44 becomes off, the charge stored in the capacitor 20 is discharged by the photocurrent flowing according to the incident optical power to the phototube 18, so that the terminal-to-terminal voltage of the capacitor 20 is decreased. The terminal voltage of the capacitor 20 thus varied can be read out when required, by turning the third switch 44 on to generate the drain current in the MOSFET 34.

An application example of low power consumption used in the connected state of the head unit 4 to the main body unit 6 is a pyrheliometer. The pyrheliometer is a sensor built in a clock or the like and adapted to measure incident ultraviolet energy. In this case, the photosensor is one sensitive to only specific wavelengths such as UV-A or UV-B. Normally, the capacitor 20 is charged at the start of use and thereafter the second switch 42 and third switch 44 are turned off. After the third switch 44 becomes off, the head unit 6 integrates power of incident ultraviolet light as described above. At this time, the supply of power to the MOSFET 34 is interrupted, so that no power is consumed. The total energy of incident ultraviolet light is read out by turning the third switch 44 on when required. When the integrating photodetection system 2 of the present embodiment is used as a pyrheliometer as described above, the power consumed during the integration of ultraviolet energy can be almost zero.

Figure 4:
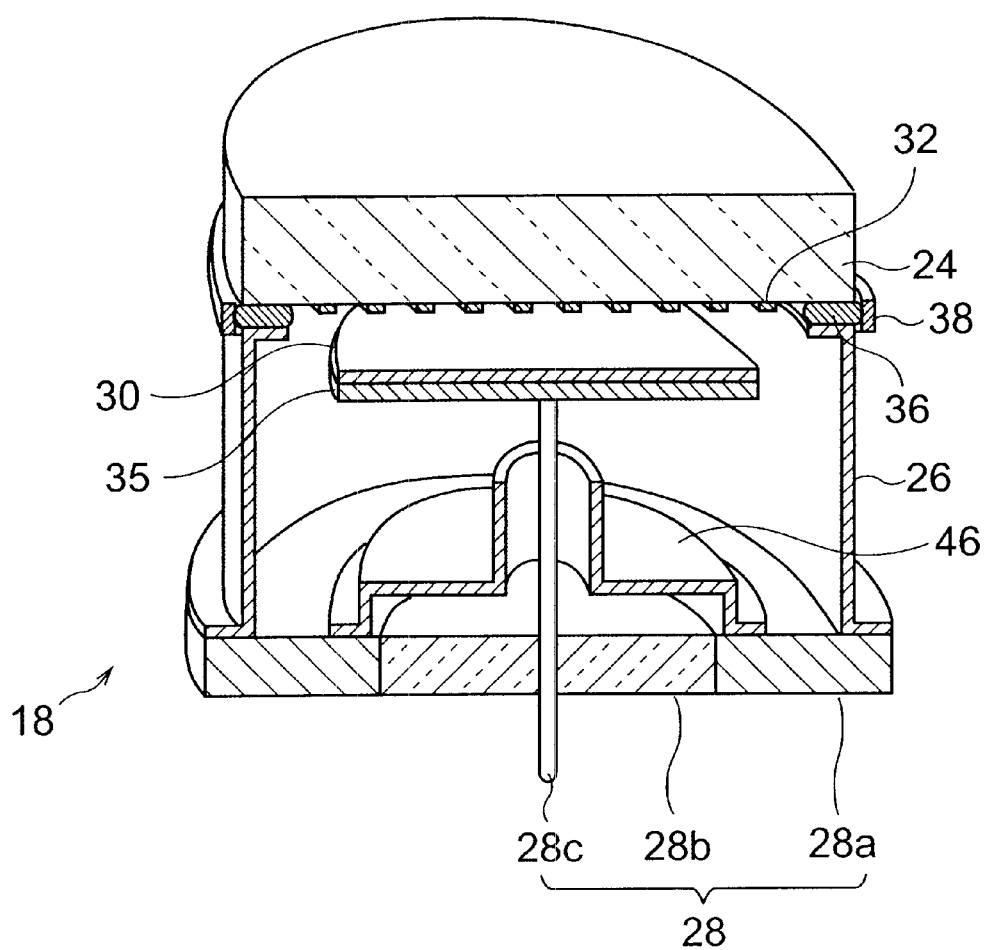
FIG. 4 is a diagram to show a modification of the integrating photodetection system 2 according to the first embodiment.

FIG. 4 shows a modification of the integrating photodetection system 2 according to the first embodiment. The integrating photodetection system 2 illustrated in FIG. 4 is different only in the internal structure of the phototube 18 as a photosensor from the integrating photodetection system 2 according to the first embodiment. In the phototube 18 illustrated in FIG. 4, a cathode electrode 35 is coupled to the upper end of the through pin 28c and the photocathode 30 is placed on the surface of this cathode electrode 35 opposite to the input face plate 24. The anode electrode 32 is evaporated in mesh patterns on the lower surface of the input face plate 24, i.e., in the vacuum area. The anode electrode 32 is electrically connected to the side tube 26 via the indium 36 for vacuum sealing and via the indium ring 38 for retaining the indium. On the other hand, the photocathode 30 is taken out via the through pin 28c to the atmosphere. On the vacuum side of the through pin 28c, a shield electrode 46 is placed so as to surround the glass internal part 28b of the stem 28. Since the internal part 28b is covered by the shield electrode 46, this structure can prevent such an accident in the step of deposition of the photocathode 30 that metal vapor of a material of the photocathode is deposited on the internal part 28b to lower the insulation resistance between the through pin 28c and the external part 28a.

The photodetector described in WO97/02609 had the problem that Na, K, and Cs of materials of the photocathode were deposited to considerably degrade the performance of the MOS transistor during production of the photocathode, because the MOS transistor was placed in a vacuum. In contrast, the photocathode illustrated in FIG. 4 overcomes this problem. The phototube 18 illustrated in FIG. 4 is produced by preparing the photocathode 30 in a vacuum device called a transfer and then vacuum-sealing it in the device with indium, as described in the official gazette of Japanese Patent Application Laid-Open No. 61-211941.

In the phototube 18 illustrated in FIG. 4, the photocathode 30 acts as a reflective photocathode. Since the anode electrode 32 is formed in the mesh shape on the bottom surface of the input face plate 24, it can partly block incidence of light to the photocathode 30. Because of this structure, the phototube 18 illustrated in FIG. 4 has the advantage of capability of freely lowering the substantial sensitivity by decreasing an aperture rate of the meshes. It can also operate stably even under circumstances in which the incident light of high power is measured at a time.

Figure 5:
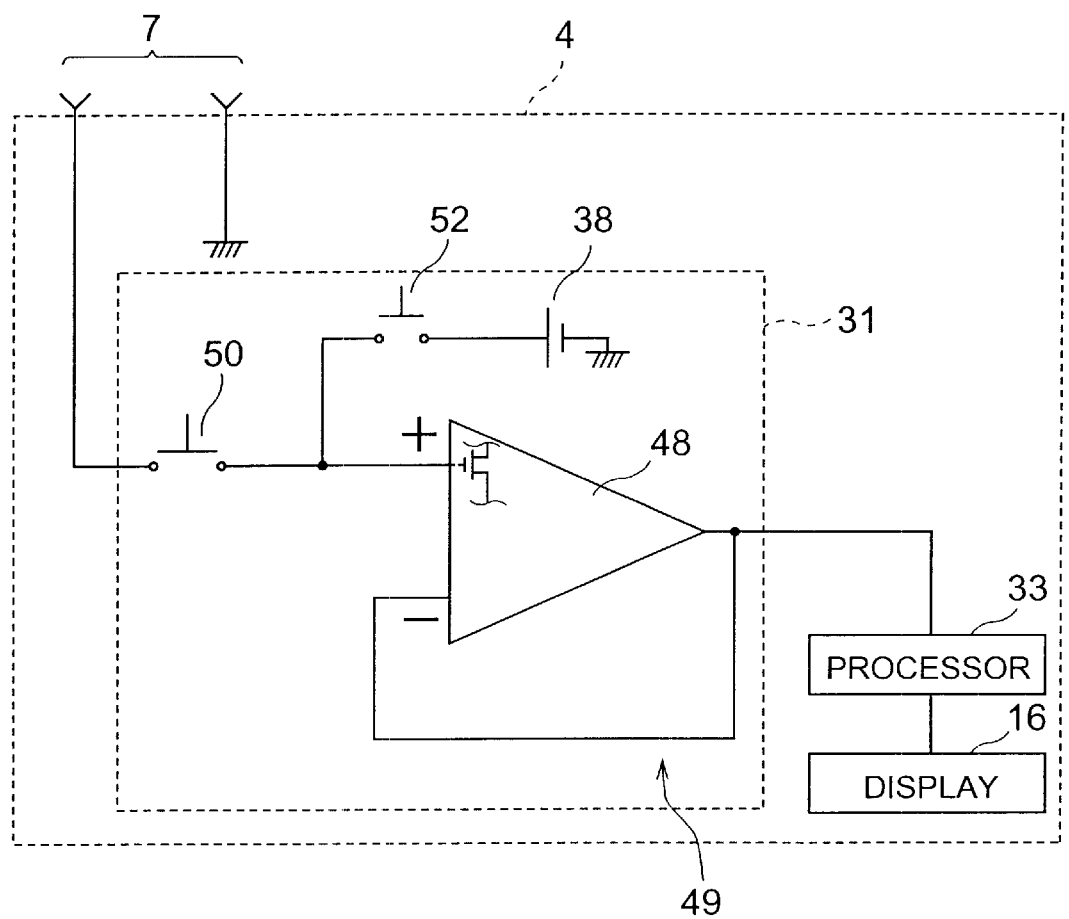
FIG. 5 is a diagram to show another modification of the integrating photodetection system 2 according to the first embodiment.

FIG. 5 shows another modification of the integrating photodetection system 2 according to the first embodiment. The integrating photodetection system 2 illustrated in FIG. 5 is different only in the circuit structure of the reading section 31 of the main body unit 4 from the integrating photodetection system 2 according to the first embodiment.

The head unit 6 can be one similar to that in FIG. 3. In the modification of FIG. 5, a voltage follower circuit 49 using an operational amplifier 48 is employed in the reading section 31. The voltage follower circuit 49 outputs an input voltage as it is. In order to avoid variation of the charge storage amount of the capacitor 20 due to input bias current of the operational amplifier 48, the operational amplifier 48 is one having an input stage of MOSFET of sufficiently small bias current. An example of such an operational amplifier is LMC601 available from National Semiconductor. The input bias current of this operational amplifier is sufficiently small, about 10 fA. If the input bias current of the operational amplifier is large the charge storage amount of the capacitor 20 will vary during the measurement and this will result in causing a large measurement error in the measurement.

The positive input pin of the operational amplifier 48 is connected to the A-terminal 7 via the first switch 50 and to the power supply 38 via the second switch 52. For charging the capacitor 20 (see FIG. 3) of the head unit 6, the first switch 50 and second switch 52 are turned on. After the capacitor 20 is charged, the head unit 6 disconnected from the main body unit 4 is exposed to incident light for a predetermined time and then the head unit 6 is attached to the main body unit 4 again. When the first switch 50 is turned on, the signal from the head unit 6 (the terminal voltage of the capacitor 20) is transmitted via the operational amplifier 48 to the arithmetic unit 33 and the arithmetic unit 33 computes the incident optical energy, based on the signal. The incident optical energy thus computed by the arithmetic unit 33 is displayed in the display unit 16.

(Second Embodiment)

Figure 6:
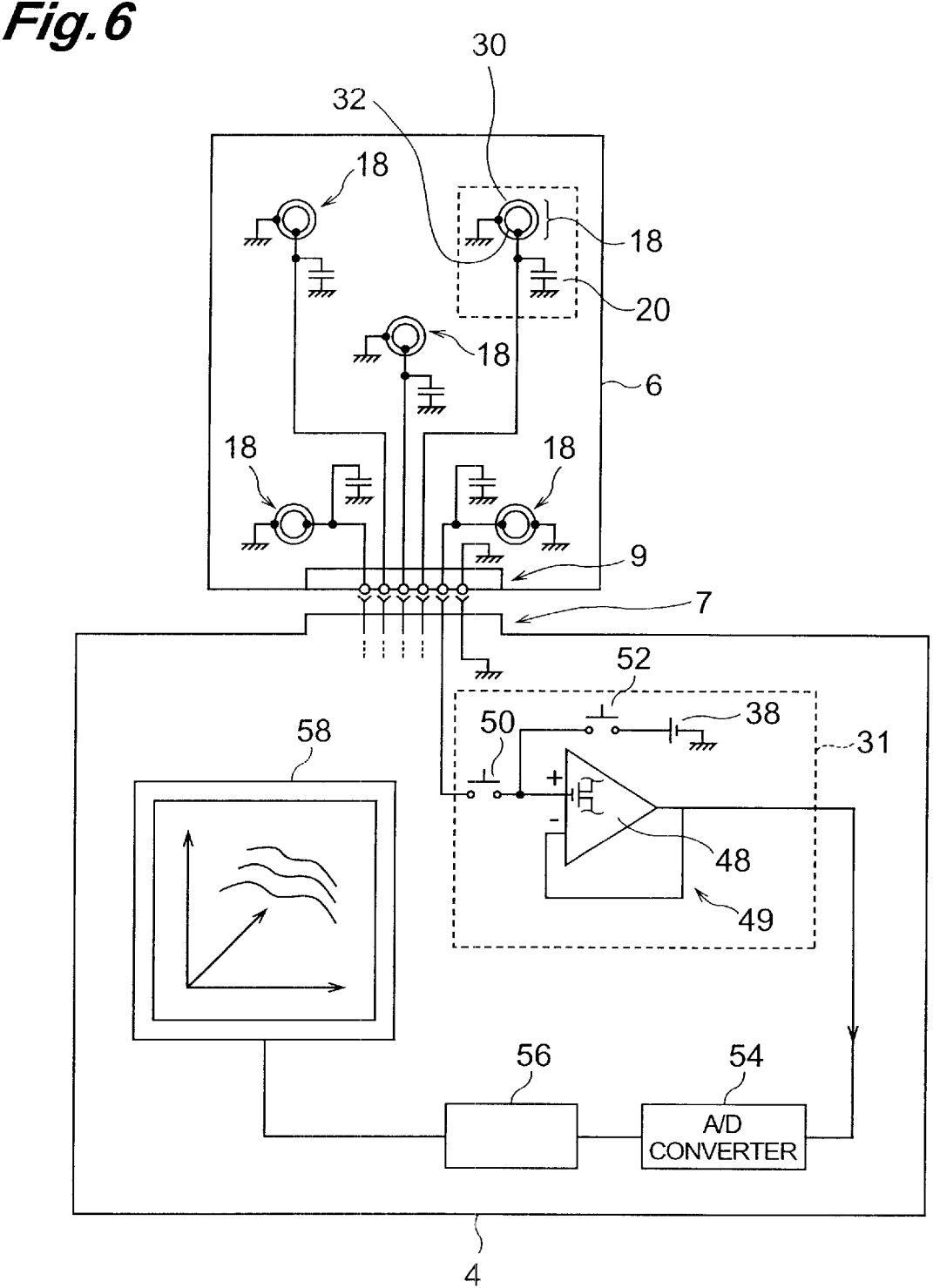
FIG. 6 is a diagram to show the second embodiment of the integrating photodetection system according to this invention.

FIG. 6 shows the second embodiment of the integrating photodetection system 2 according to the present invention. The integrating photodetection system 2 of the second embodiment is used as a luminous energy monitor for an optical cleaning device using an excimer lamp. The head unit 6 incorporates five phototubes 18 as photosensors arranged at predetermined spacing, and a capacitor 20 and a B-terminal 9 are connected to each phototube 18. A photocathode 30 (cathode) is provided on the back side of each phototube 18 in the normal direction to FIG. 6, and the photocathodes 30 are grounded. On the other hand, an anode electrode 32 as a target for accepting photoelectrons from the corresponding photocathode 30 is placed on this side of each phototube 18 in the normal direction to FIG. 6, and the anode electrode 32 is connected to the capacitor 20 and to the B-terminal 9.

The main body unit 4 is provided with the A-terminals 7 to be connected to the B-terminals 9 of the head unit 6, the signal reading section 31 including the voltage follower circuit 49 comprised of the operational amplifier 48, an A/D converter 54 connected to the output pin of the operational amplifier 48, a computer 56, and a monitor 58. The signal reading section 31 is the same as the one illustrated in FIG. 5. Actually, the main body unit has five sets of signal reading section 31 and A/D converter 54 corresponding to the respective phototubes 18, but FIG. 6 illustrates only one set for easy recognition of illustration. Further, the reset button 12 and reading button 14, though not illustrated, are provided in the external part of the main body unit 4, as in the first embodiment (see FIG. 1).

In use of the integrating photodetection system 2 of the present embodiment, the operator first inserts the B-terminals 9 into the A-terminals 7 and couples the head unit 6 to the main body unit 4 and then the operator pushes the reset button 12 externally mounted in the main body unit 4. This turns the first switch 50 and second switch 52 on in order, whereby all the capacitors 20 of the head unit 6 are charged (or reset). After that, the head unit 6 is disconnected from the main body unit 4 and is treated (or exposed to light) like an ordinary glass panel in the optical cleaning device. After completion of exposure to light, the head unit 6 is connected to the main body unit 4 again and the operator depresses the reading button 14 externally mounted in the main body unit 4, whereupon the first switch 50 is turned on to measure the terminal voltage of each capacitor 20. The terminal voltage of each capacitor 20 is read out by the voltage follower circuit 49, it is converted thereafter into a digital value by the A/D converter 54, and the digital signal is inputted into the computer 56. The computer 56 computes the integral of optical power incident to each phototube 18, based on the terminal voltage of each capacitor 20, and displays the computation result of the incident optical energy in the monitor 58.

In general, the conventional optical cleaning apparatus adopted a method of monitoring the quantity of light of a light source by a photosensor placed at a position different from an object, for the measurement of luminous energy, but had the problem that the photosensor placed at the position different from the object was not able to monitor the quantity of light actually radiated to the object. This hindered optimization of luminous energy of the optical cleaning apparatus, so as to end in a cleaning failure due to shortage of radiation energy or a decrease of line speed due to excessive radiation of light. With the integrating photodetection system 2 of the present embodiment, however, the head unit 6 similar to the treated object is used and is subjected to the light irradiation treatment just like the treated object and thereafter the integral of irradiation light energy to the head unit 6 is read out. Therefore, the quantity of light actually radiated to the treated object can be detected and displayed in the monitor. Particularly, since the head unit 6 of the present embodiment has the five phototubes 18 arranged at the predetermined spacing, it can also measure positional distribution of illuminance in the optical cleaning device.

In the luminous energy monitor apparatus for the optical cleaning device the temperature of the head unit 6 increases up to 100° C., but the head unit 6 of the integrating photodetection system 2 of the present embodiment can stand the use under the high-temperature circumstances, because it is constructed of the passive circuit comprised of the phototubes 18 and capacitors 20. Further, since the head unit 6 is composed of the small number of components, it can be constructed in the slim and lightweight structure similar to the glass panel as the treated object. Further, since the photosensors and capacitors both are compact, it is easy to place a plurality of photosensors in the head unit 6. It is also noted that in the present embodiment the capacitances of the capacitors can be adequately changed according to incident optical energy, as in the first embodiment.

(Third Embodiment)

Figure 7:
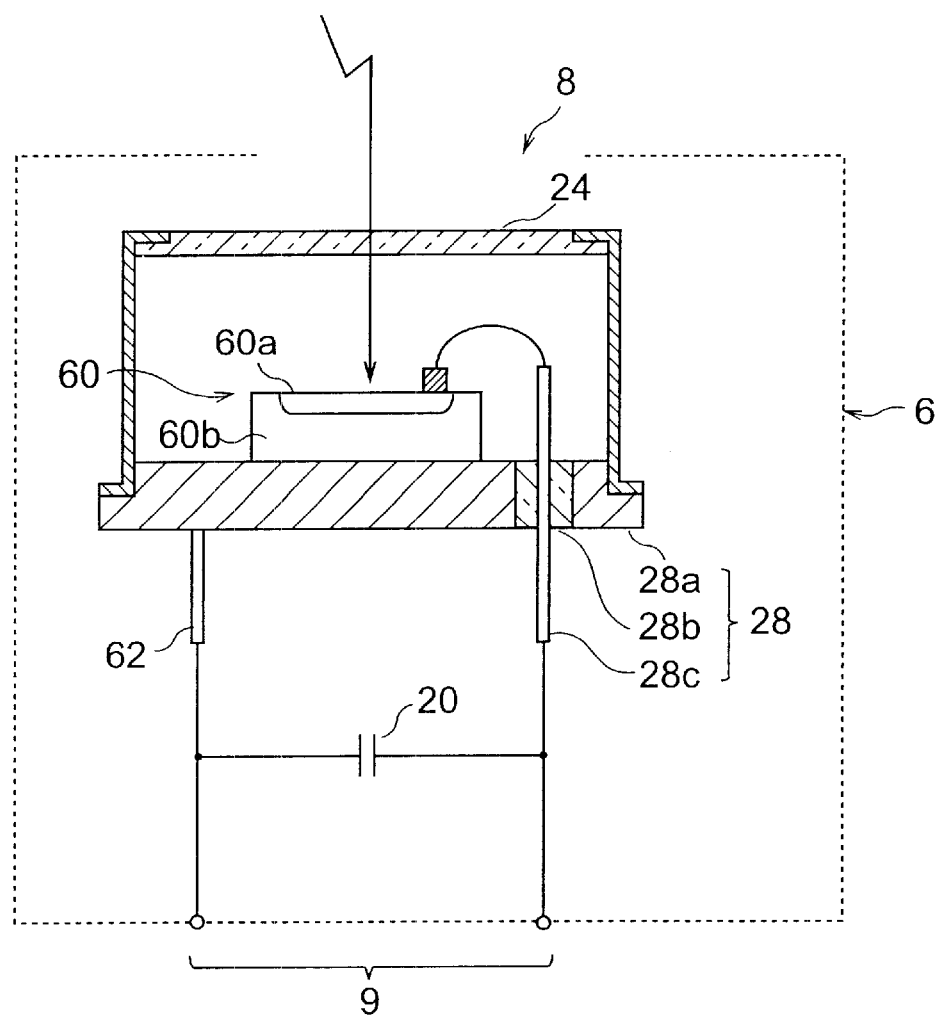
FIG. 7 is a diagram to show the head unit in the third embodiment of the integrating photodetection system according to this invention.

FIG. 7 shows the third embodiment of the integrating photodetection system 2 according to the present invention. The integrating photodetection system of the present embodiment is different from each of the above embodiments in that SiC photodiode 60 comprised of a pn junction is used as a photosensor of the head unit 6. The p-type semiconductor 60a of the photodiode 60 is connected via the through pin 28c to the plate of the capacitor 20 in which the negative charge is stored in the charging of the capacitor 20, out of the two plates of the capacitor 20, while the n-type semiconductor 60b is connected via a pin 62 to the plate in which the positive charge is stored in the charging of the capacitor 20. Namely, the head unit 6 is constructed so as to apply a backward bias voltage to the photodiode 60 while the head unit 6 is disconnected from the main body unit 4.

When measured light is incident to the head unit 6 of the present embodiment, the incident light travels through the entrance port 8 and input face plate 24 to reach the photodiode 60. When the incident light impinges on the photodiode 60, the incident light excites atoms to make electrons jump out. The electrons jumping out are attracted toward the n-type semiconductor 60b. This causes the photocurrent to flow, whereupon the charge stored in the capacitor 20 is discharged. Particularly, since the backward bias voltage is applied to the photodiode 60, the photocurrent flows efficiently. After completion of the measurement of incident light, the terminal voltage of the capacitor 20 is read out and the integral of incident optical power is computed based on this terminal voltage, as in the first embodiment. Since in the present embodiment the head unit 6 is also constructed of the passive circuit comprised of the photodiode 60 and capacitor 20, it can stand the use under the high-temperature circumstances.

The invention accomplished by the inventor was described in detail, based on the embodiments thereof, but it should be noted that the present invention is by no means intended to be limited to the above embodiments. For example, an appropriate modification can be made in the circuit for charging the capacitor and in the circuit for measuring the terminal voltage of the capacitor.

As described above, in the integrating photodetection apparatus according to the present invention, the capacitor of the head unit is charged by the charging circuit of the main body unit while the first terminals of the main body unit are coupled to the second terminals of the head unit. After completion of the charging, the incident energy of light is measured by the head unit. When light is incident to the photosensor of the head unit, the photosensor generates the photocurrent according to incident optical power. Then the charge stored in the capacitor by the charging circuit is discharged as the photocurrent is generated. After the end of incidence of light to the photosensor, the voltage of the capacitor after the discharge is read out by the reading circuit of the main body unit in the state in which the first terminals of the main body unit are coupled to the second terminals of the head unit. Then the optical energy of light incident to the photosensor is computed based on this voltage thus read out. According to the present invention, the integration of incident optical power is effected by the capacitor, and replacement of the capacitance of the capacitor enables the sensor to stand the incidence of light of high power and the reception of light over a long period.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An integrating photodetection system for integrating light incident to a photosensor to detect a quantity of the incident light, said integrating photodetection system comprising a main body unit which has a first terminal, and a head unit which has a second terminal capable of being attached to and detached from said first terminal and which is attachable to and detachable from said main body unit, said head unit comprising said photosensor which is connected to said second terminal and which generates photocurrent according to said quantity of the incident light, and a capacitor which is connected to the photosensor, said main body unit comprising a charging circuit which is connected to said first terminal and which can charge said capacitor while said first terminal is coupled to said second terminal, and a reading circuit which can read a voltage of said capacitor out while said first terminal is coupled to said second terminal, wherein said capacitor is discharged as said photocurrent is generated, said photosensor is an electron tube comprising a photocathode which emits photoelectrons according to incidence of the light, and a target of said photoelectrons, and said capacitor is positioned outside of said photosensor and is electrically connected to said photocathode and said target.

2. An integrating photodetection system for integrating light incident to a photosensor to detect a quantity of the incident light, said integrating photodetection system comprising a main body unit which has a first terminal, and a head unit which has a second terminal capable of being attached to and detached from said first terminal and which is attachable to and detachable from said main body unit, said head unit comprising said photosensor which is connected to said second terminal and which generates photocurrent according to said quantity of the incident light, and a capacitor which is connected to the photosensor, said main body unit comprising a charging circuit which is connected to said first terminal and which can charge said capacitor while said first terminal is coupled to said second terminal, and a reading circuit which can read a voltage of said capacitor out while said first terminal is coupled to said second terminal, wherein said capacitor is discharged as said photocurrent is generated, said photosensor is a semiconductor device comprising a pn junction, and said capacitor is positioned outside of said photosensor and is electrically connected to a p-type semiconductor and an n-type semiconductor of said semiconductor device.

3. The integrating photodetection system according to claim 1, wherein said photosensor is a semiconductor device comprised of a pn junction.

4. The integrating photodetection system according to claim 1, wherein said head unit comprises a plurality of said photosensors and said capacitors connected to the photosensors and wherein each of the plurality of said photosensors and the plurality of said capacitors is connected to said second terminal.

5. The integrating photodetection system according to claim 2, wherein said head unit comprises a plurality of said photosensors and said capacitors connected to the photosensors and wherein each of the plurality of said photosensors and the plurality of said capacitors is connected to said second terminal.

6. The integrating photodetection system according to claim 2, wherein the electrical connection of said capacitor to said p-type and n-type semiconductors of said semiconductor device is configured to allow application of a backward bias voltage to said photosensor while said head unit is disconnected from said main unit.

* * * * *